(12) United States Patent
Pyyhtiä et al.

(10) Patent No.: US 6,248,990 B1
(45) Date of Patent: *Jun. 19, 2001

(54) RADIATION IMAGING DEVICE WITH AN ARRAY OF IMAGE CELLS

(75) Inventors: Jouni Ilari Pyyhtiä, Vantaa (FI); Konstantinos Evangelos Spartiotis, Athens (GR)

(73) Assignee: Simage Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,778

(22) Filed: Oct. 10, 1997

(30) Foreign Application Priority Data

Oct. 15, 1996 (GB) .................................... 9621470

(51) Int. Cl.⁷ ............................ G01T 1/00; H01L 27/146
(52) U.S. Cl. .................... 250/208.1; 250/370.08; 250/370.09; 378/62; 378/98.8
(58) Field of Search .................... 250/208.1, 208.2, 250/208.3, 208.4, 208.5, 231.1, 574, 328, 366, 369, 370.01, 370.02, 370.03, 370.06, 370.07, 370.08, 370.09, 370.11, 370.14; 378/62, 63, 98.8, 98.9, 98.11, 98.12

(56) References Cited

U.S. PATENT DOCUMENTS

| 4,131,798 | 12/1978 | Reddy et al. ............. 250/328 |
| 4,804,854 | * 2/1989 | Adachi et al. ............ 250/578.1 |
| 5,107,122 | * 4/1992 | Barkan et al. ............ 250/370.01 |
| 5,151,588 | * 9/1992 | Kiri et al. .............. 250/370.09 |
| 5,235,176 | 8/1993 | Noble et al. ............. 250/208.2 |
| 5,379,336 | * 1/1995 | Kramer et al. ........... 250/370.09 |
| 5,574,284 | * 11/1996 | Farr .................... 250/370.01 |
| 5,665,969 | * 9/1997 | Beusch ................. 250/370.09 |
| 5,742,659 | * 4/1998 | Atuc et al. ............. 250/370.01 |

FOREIGN PATENT DOCUMENTS

| 0 205 624 | 12/1986 | (EP) . |
| 0 287 197 | 10/1988 | (EP) . |
| 2 262 383 | 6/1993 | (GB) . |
| 2 289 979 | 12/1995 | (GB) . |
| WO 95/33332 | 12/1995 | (WO) . |

OTHER PUBLICATIONS

Abstract and Drawing Figure from Japanese Patent Application 61–03461, published Aug. 22, 1987.

\* cited by examiner

*Primary Examiner*—John R. Lee
(74) *Attorney, Agent, or Firm*—Kenyon & Kenyon

(57) ABSTRACT

A radiation imaging device includes an image cell array having an array of detector cells and an array of image cell circuits. Each image cell circuit is associated with a respective detector cell and includes counting. The image cell circuits may include threshold circuitry configured to receive signals generated in the respective detector cell and having values dependent on the incident radiation energy. The counting circuitry may be coupled to the threshold circuitry.

19 Claims, 6 Drawing Sheets

RADIATION IMAGING DEVICE WITH AN ARRAY OF IMAGE CELLS

BACKGROUND OF THE INVENTION

1. Field of the Invention

The present invention relates generally to the field of radiation imaging, and in particular to radiation imaging devices having an array of image cells.

2. Related Art

A variety of imaging devices comprising an array of image cells are currently known. A charged coupled image sensor (also known as a charged coupled device (CCD)) is one example of such an imaging device. A CCD type device operates in the following way. Charge is accumulated within a depletion region created by an applied voltage. For each pixel (image cell) the depletion region has a potential well shape and constrains electrons under an electrode gate to remain within the semiconductor substrate. Voltage is then applied as a pulse to the electrode gates of the CCD device to clock each charge package to an adjacent pixel cell. The charge remains inside the semiconductor substrate and is clocked through, pixel by pixel, to a common output. During this process, additional charge cannot be accumulated.

Another type of imaging device which is known is a semiconductor pixel detector which comprises a semiconductor substrate with electrodes which apply depletion voltage to each pixel position and define a charge collection volume. Typically, simple buffer circuits read out the electric signals when a photon is photo-absorbed or when ionizing radiation crosses the depletion zone of the substrate. Accordingly pixel detectors of this type typically operate in a pulse mode, the numbers of hits being accumulated externally to the imaging device. The buffer circuits can either be on the same substrate as the charge collection volumes, as disclosed in European Patent Application EP-A-0287197, or on a separate substrate that is mechanically bonded to a substrate having the charge collection volumes in accordance with, for example, the well known bump-bonding technique, as disclosed in European Patent Application EP-A-0571135.

Another type of imaging device is described in International patent application WO95/33332, which describes an Active-pixel Semiconductor Imaging Device (ASID). The ASID comprises an array of pixel cells including a semiconductor substrate having an array of pixel detectors and a further array of pixel circuits. The pixel detectors generate charge in response to incident radiation. Each pixel circuit is associated with a respective pixel detector and accumulates charge resulting from radiation incident on the pixel detector. The pixel circuits are individually addressable and comprise circuitry which enables charge to be accumulated from a plurality of successive radiation hits on the respective pixel detectors. The device operates, for example, by accumulating charge on a gate of a transistor. Accordingly, analog storage of the charge value is obtained. At a determined time, the charge from the pixel circuits can be read out and used to generate an image based on the analog charge values stored in each of the pixel circuits.

CCD devices suffer from several disadvantages, including limited dynamic range due to the limited capacity of the potential well inside the semiconductor substrate, and inactive times during which an image is read out. Pulse counting semiconductive pixel devices also suffer from limited dynamic range. As these devices read the pixel contact when a hit is detected, they suffer from saturation problems at high counting rates. The semiconductor pixel device according to WO95/33332 provides significant advantages over the earlier prior art by providing a large dynamic range for the accumulation of images.

However, CCD imaging devices and imaging devices of the type described in WO95/33332 suffer from a potential disadvantage in that the output signals from the individual pixel cells represent the accumulation of radiation intensity at that pixel cell between readout times. This means that radiation hits of varying energies could lead to an inaccurate count of the number of radiation hits. For example, a relatively small number of higher energy radiation hits would give the same output signal as a higher number of lower energy radiation hits (for example, scattered radiation hits).

Embodiments of the present invention seek to mitigate the problems of known imaging devices described above.

SUMMARY OF THE INVENTION

According to an embodiment of the present invention, an imaging device for imaging radiation comprises an imaging cell array including an array of detector cells which generate charge in response to incident radiation and an array of image cell circuits. Each image cell circuit is associated with a respective detector cell, and the image cell circuit comprises counting circuitry for counting plural radiation hits incident on the associated detector cell.

In accordance with this embodiment, it is possible to provide an accurate count of the number of hits on each image cell even at high intensities (e.g., high hit rates) by counting each incident radiation hit on each image cell. An example of a device implementing such an embodiment avoids readout bandwidth problems by counting at the image cells and allowing readout at a much lower rate than would be the case with typical pulse counting devices where the signals need to be read out of the device before being counted.

Embodiments of the present invention also simplify the processing necessary on reading out the contents of the array of image cells. Typically the image cells will be pixels of a two-dimensional array; however, the image cells could also be strips in a strip cell in an imaging strip device.

In accordance with another embodiment, an image cell circuit may comprise threshold circuitry connected to receive signals generated in an associated detector cell, with threshold values dependent on incident radiation energy. Counting circuitry may be connected to the threshold circuitry for counting only radiation hits within a predetermined energy range or ranges.

By providing thresholding of the signals at each image cell, it is possible to reduce the storage capacity of the counter which is required, and also accurately to record the number of radiation hits of a desired energy. By recording hits of only selected radiation energies, it is possible, for example, to ensure that only directly incident rays are counted, and counting of hits resulting from scattered, reflected or defracted rays (which will have a lower energy) can be avoided. By use of this technique, the overall quality and resolution of an image can be greatly improved.

In accordance with another embodiment, the threshold circuitry comprises first and second comparators for comparing an input signal value to upper and lower threshold values, respectively. By using two comparators, it is possible to identify signals within a range having upper and lower bounds. With a single threshold comparator, it would be possible to obtain storage of signals either above, or below, that threshold. A trigger circuit responsive to outputs of the first and second comparators may be provided to increment a count in a counter in response to input signals having a value between the first and second threshold values. This may be achieved, for example, by providing the trigger circuitry with a flip-flop having a clock input connected via delay circuit to an output of the second comparator, a data signal input connected via a one shot circuit to an output of the first comparator and an output connected to the counter. To enable the image accumulation process to be substantially continuous, the output of the counter is connectable to a loadable shift register. The shift register of an image cell circuit is chained (in series) with respective shift registers of further image cell circuits of the array.

According to an alternate embodiment, a first counter is responsive to the output of the first comparator, and a second counter is responsive to an output of the second comparator. In order to enable the image accumulation process to be substantially continuous, in this embodiment the output of the first counter is connected to a first loadable shift register and the output of the second counter is connected to a second loadable shift register. The first and second loadable shift registers of an image cell circuit are chained together (in series or possibly at least partially in parallel) and with shift registers of further image cell circuits of the array. The shift registers of the image cell circuits may be connected to an output shift register arrangement external to the array. Further, the output shift register may have a dual x-y configuration.

According to another embodiment of the invention, an imaging system may be configured using one or more imaging devices in accordance with the embodiments described above.

DETAILED DESCRIPTION

Figure 1:
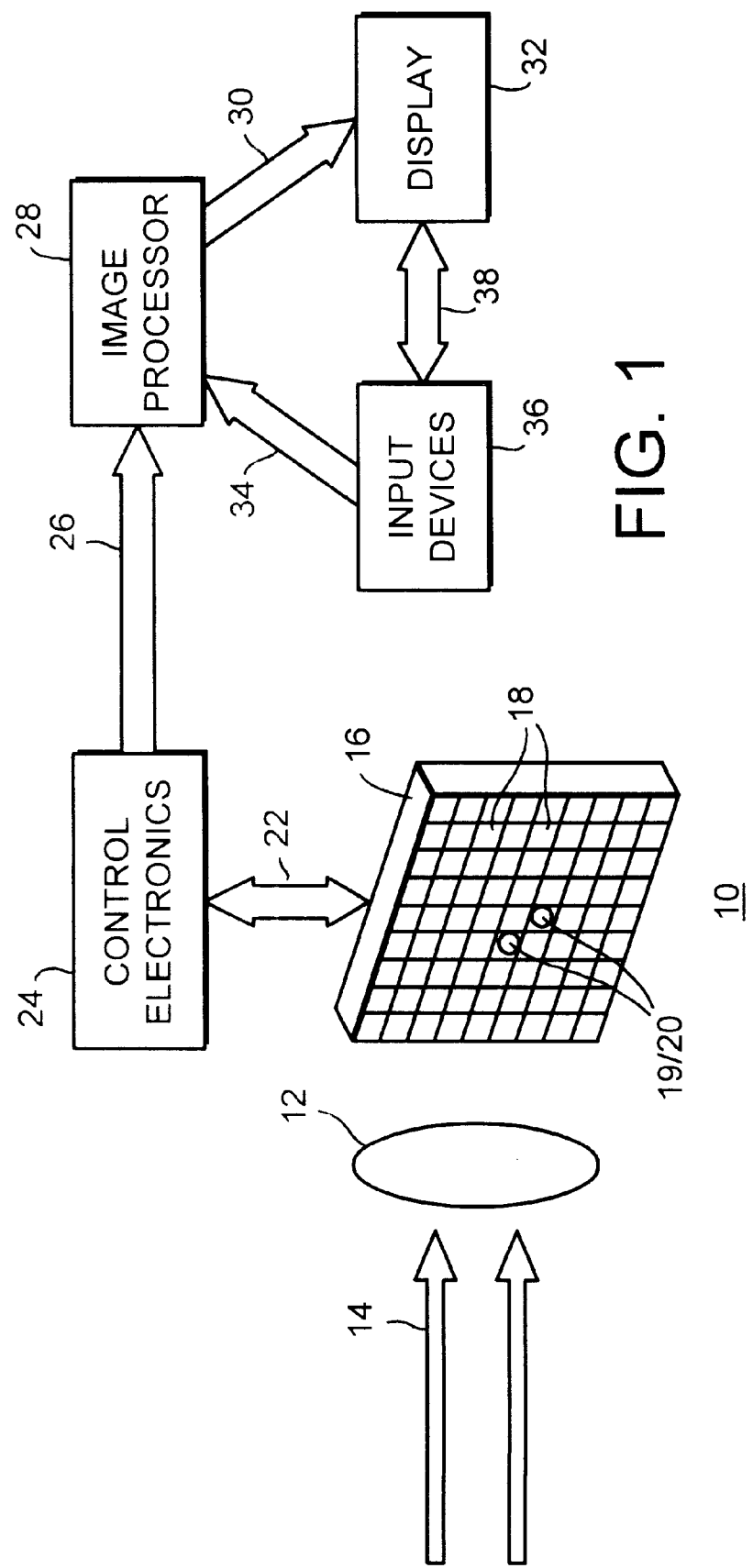
FIG. 1 a schematic block diagram of an overall imaging system configuration according to an embodiment of the present invention.

FIG. 1 is a schematic block diagram of one example of an imaging system using an imaging device in accordance with an embodiment of the present invention. This particular embodiment is directed to the imaging of high-energy radiation, such as X-ray radiation. In this context, high-energy radiation is radiation having an energy in excess of approximately 1 KeV. However, the present invention is by no means limited to high-energy radiation such as X-rays, but rather could be applied to the detection of any particular radiation, for example γ-ray, β-ray, α-ray, infra-red or optical radiation, subject to an appropriate choice of semiconductor substrate and threshold values as described below.

The imaging system 10 of FIG. 1 is shown to provide imaging of an object 12 subject to radiation 14. In this example the radiation may, for example, be X-ray radiation as mentioned above, but could alternatively be γ-ray, β-ray or α-ray radiation. The object 12 may, for example, be part of a human body. The imaging device 16 comprises a plurality of image cells (here, pixel cells 18 of a two-dimensional pixel array). In the following, reference will be made to pixel cells, although it will be appreciated that in other embodiments the individual image cells may have a configuration other than that of a pixel within a two-dimensional array (e.g., a strip arrangement).

The imaging device 16 detects directly high-energy incident radiation and accumulates at each pixel cell 18 a count of the incident radiation hits at that pixel cell 18. The imaging device 16 can be configured as a single semiconductor substrate (e.g., of silicon) with each pixel cell 18 comprising a pixel detector 19 and a pixel circuit 20. Alternatively, the imaging device 16 can be configured on two substrates, one with an array of detector cells and one with an array of corresponding pixel circuits 20, the substrates being mechanically connected to each other by, for example, conventional bump-bonding technology or any other appropriate technology.

Figure 2:
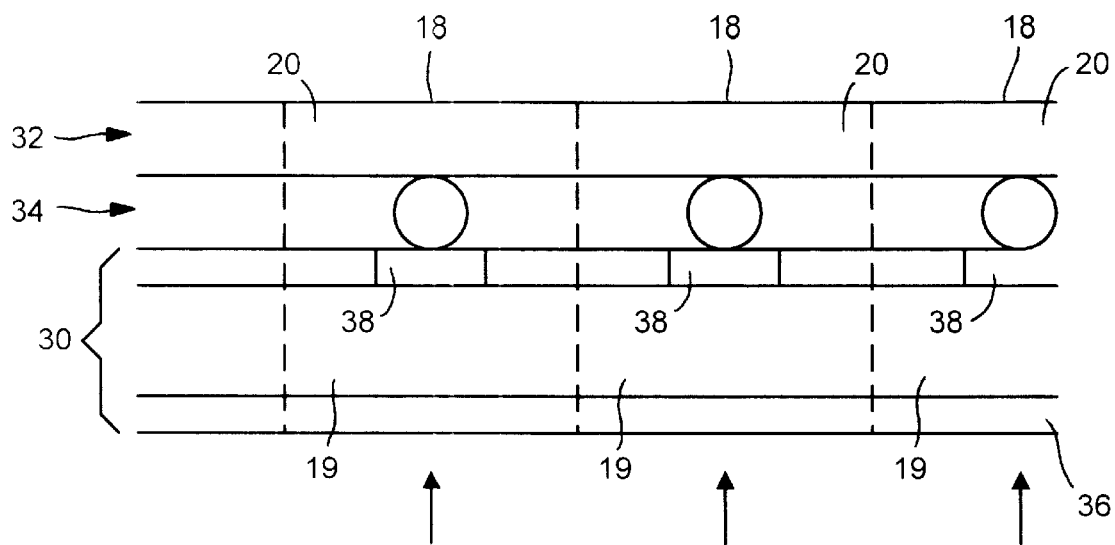
FIG. 2 is a cross-section of a pixel imaging device according to an embodiment of the present invention.

FIG. 2 is a schematic cross-section of part of an imaging device 16 according to an embodiment of the present invention. In this embodiment, the imaging device 16 comprises an image detector substrate 30 connected to an image circuit substrate 32 by means of bump-bonds 34. A pixel detector 19 of each pixel cell 18 is defined on the detector substrate 30 by a continuous electrode 36 which applies a biasing voltage and pixel location electrodes 38 to define a detection zone for the pixel cell 18. Corresponding pixel circuits 20 on the image circuit substrate 32 are defined at locations corresponding to the electrodes 38 (i.e., to the pixel detectors 19). The pixel circuits 20 are electrically connected to the corresponding electrodes 38 by bump-bonds 34. In this manner, when charge is generated in a pixel detector 19 in response to incident radiation, the charge is passed via the bump-bond 34 to the corresponding pixel circuit 20.

The actual size of the pixel circuit 20 and the pixel detector 19 will depend on the application for which the imaging device is intended, and will also depend on the integrated circuit technology available for constructing the image circuit 20 (as described below). With current circuit technology, it is difficult, if not impossible, to obtain the smallest possible image detectors which would be required in some applications. Typically, the minimum pixel size is on the order of 200 micrometres square using current technology. However, with advances expected in circuit manufacturing technology, it is expected that this minimum size can be significantly reduced using the teaching of the present application and improved circuit fabrication techniques. Accordingly, the present invention is not limited to any particular pixel image size.

As mentioned above, pixel detectors and pixel circuits could be constructed integrally on a single semiconductor substrate. Such an implementation is possible, but sets challenges unrelated to the present invention, relating to circuit manufacturing techniques. With suitable circuit manufacturing techniques, the invention as described herein is perfectly applicable to implementation on a single semiconductor substrate, as opposed to the dual-substrate technique described herein.

Any appropriate semiconductor materials can be used for the substrates. For example, silicon may be used for both the detector substrate and the image circuit substrate. Other semiconductor materials could also be used. For example, the detector substrate may use a material selected from: CdZnTe, CdTe, $HgI_2$, InSb, GaAs, Ge, TlBr, Si and PbI.

Figure 3:
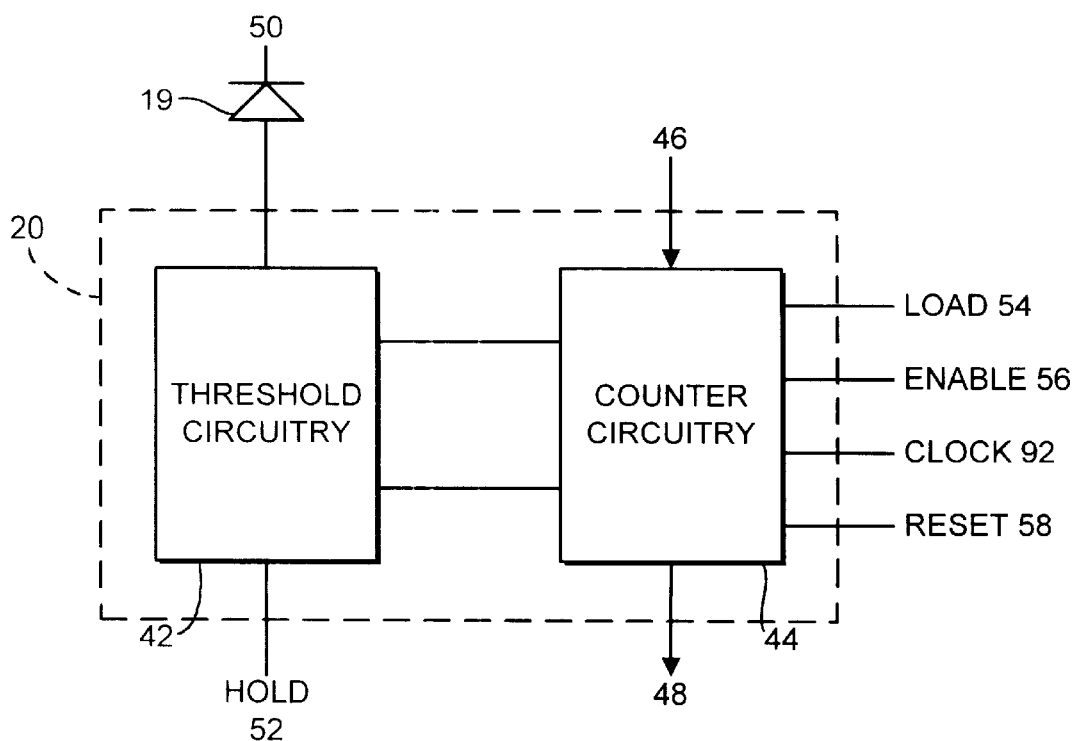
FIG. 3 is a schematic diagram of an image cell circuit of the image detector of FIG. 2.

FIG. 3 is a schematic diagram of an individual pixel circuit 20 according to an embodiment of the present invention. The pixel detector 19 is represented by the diode in FIG. 3. The input 50 to the pixel circuit 20 corresponds to the bump-bonding connection 34 between the pixel detector 19 and the pixel circuit 20.

When a photon is photo-absorbed in a detection zone of the pixel detector 19 creating an electric charge, or when a charge radiation ionizes a detection zone of the pixel detector 19, an electric pulse flows from the pixel detector 19 via the bumpbond 34/50 to threshold circuitry 42 of the pixel circuit 20. The threshold circuitry 42 effectively filters the input radiation intensity by comparing the input pulse peak to one or more threshold values. The output of the threshold circuitry 42 is connected to counter circuitry 44 for counting pulses (radiation hits) within one or more predetermined ranges as defined by the threshold circuitry. The counter circuitry is connected to counter circuitry of other (typically adjacent) pixel circuits for readout purposes. Various inputs to the pixel circuit 20 include hold 52, load 54, enable 56, reset 58 and clock 92 signal lines and voltage supply lines Vdd and Vss (not shown).

Figure 4:
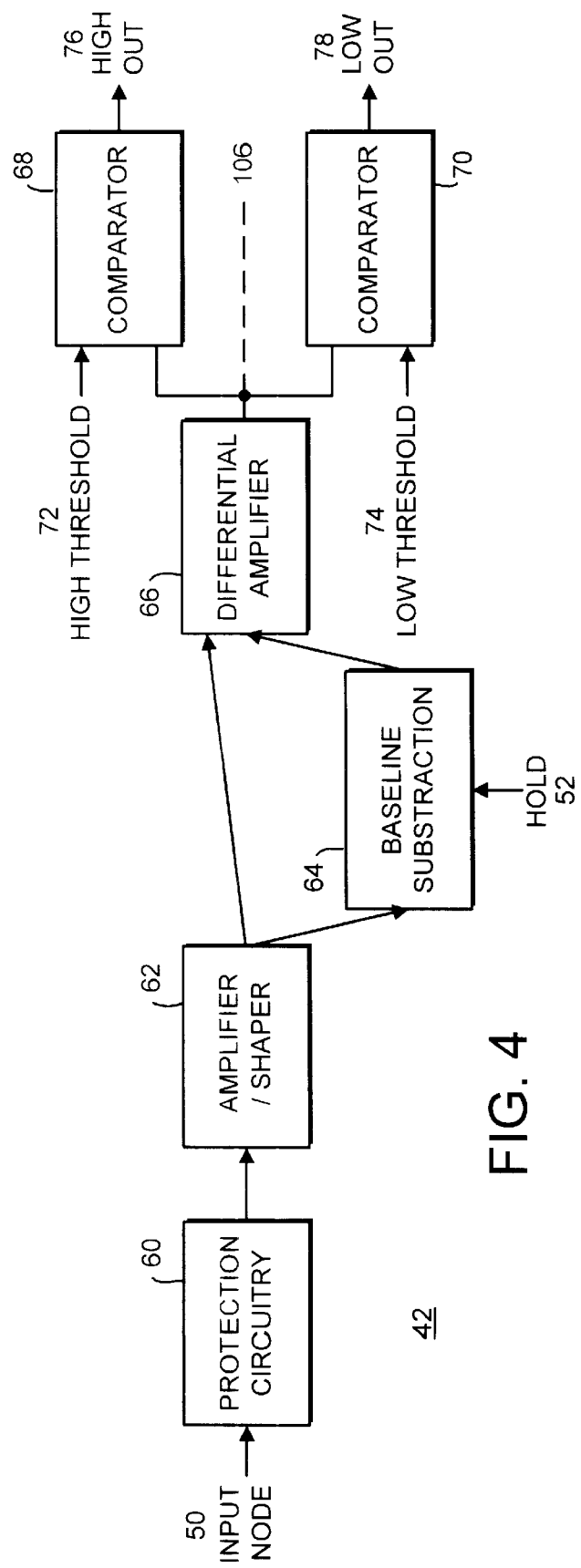
FIG. 4 is a schematic block diagram of an example of threshold circuitry of the image cell circuit of FIG. 3.

FIG. 4 is a schematic block diagram of the threshold circuitry 42 represented in FIG. 3. As shown in FIG. 4, protection circuitry 60 is connected to the input node 50 (i.e., the bump-bond connection 34 to the pixel detector 19). The protection circuitry is provided to prevent damage due to over- or under-voltage values and is typically provided by two diodes connected to the high and low supply line Vdd and Vss (not shown). The output of the protection circuitry 60 is connected to amplifier/shaper circuitry 62 which produces an analog signal proportional to the charge injection of a delta peak. The amplifier shaper 62 may be implemented by means of a charge sensitive amplifier followed by a shaper. The shaping time depends on the maximum signal rate on a pixel. FIG. 4 illustrates optional baseline subtraction circuitry which may be used if the leakage current varies significantly within the selected shaping time. Optionally, one can select the time when the baseline is sampled. In this case, the baseline is sampled outside normal measurement times.

A differential amplifier 66 subtracts the baseline so that comparators 68 and 70 see the true peak signal height. First and second comparators 68 and 70 have respective high and low threshold values 72 and 74 input thereto. The high and low threshold values can represent higher and lower limits of accepted signal amplitudes. In this case, any signal peaks below the low threshold and above the high threshold will be rejected by the counter circuitry 44. If the peak signal value exceeds the high threshold value 72, then the first comparator 68 outputs a logic 1, otherwise it outputs a logic 0. Similarly, if the peak signal value exceeds the low threshold value 74, then the second comparator 70 outputs a logic 1, otherwise it outputs a logic 0. It will be appreciated that the comparison output values of the present embodiment form one example only, and in other embodiments of the invention other values could be output as a result of the comparisons.

Figure 5:
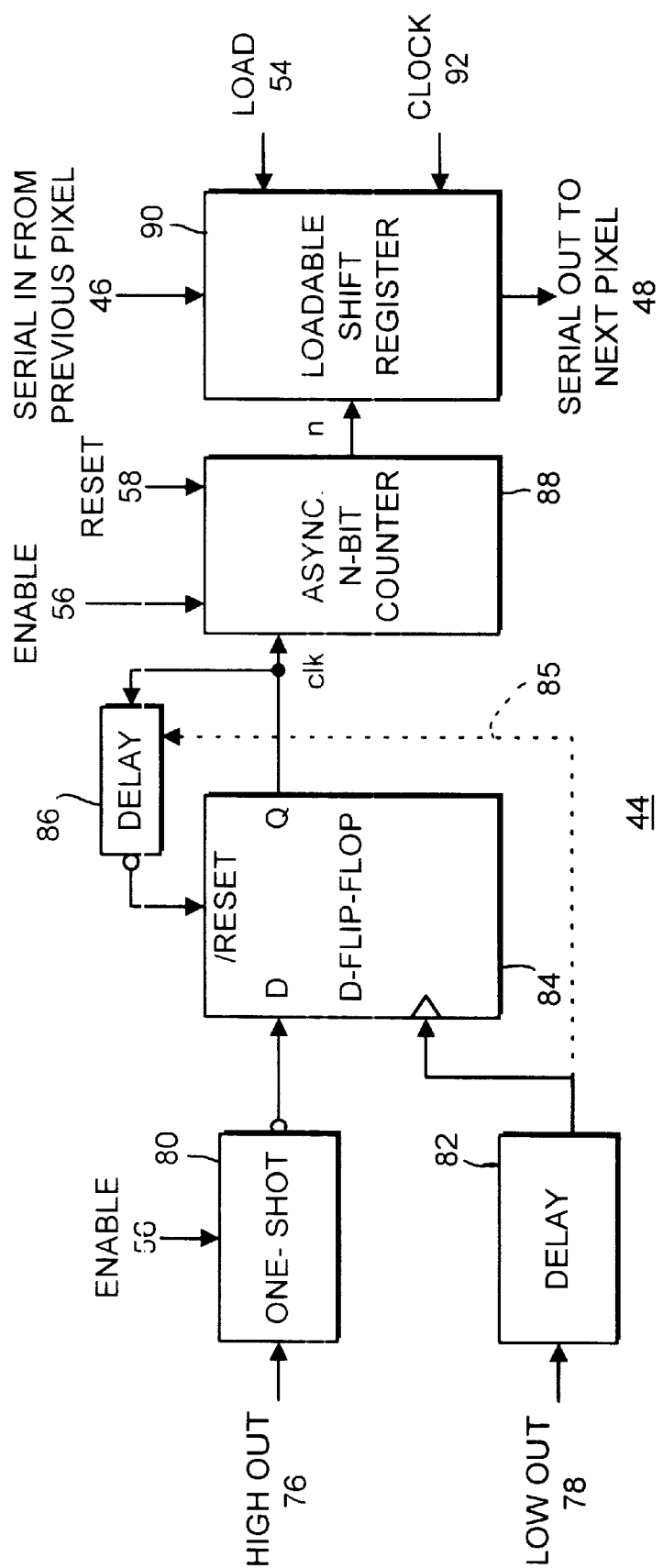
FIG. 5 is a schematic block diagram of an example of counter circuitry of an image cell circuit of FIG. 3.

FIG. 5 is a schematic block diagram of a first example of counter circuitry 44. Depending on the shaping parameters and signal amplitudes, the high output signal 76 from the first comparator 68 always comes some time later than the low output 78 from the second comparator 70. In FIG. 5, the high output 76 from the first comparator 68 is supplied to a one-shot circuit 80 which is responsive to the enable signal 56. The low output 78 from the second comparator 70 is supplied to a delay circuit 82. By applying a delay to the low output 78, the order of the signals 76 and 78 can be reversed so that the signal received from the delay circuit 82 at the clock input C of a D-flip-flop 84 always comes later than the inverted output of the one-shot circuit 80 which is supplied to the D input of the D-flip-flop 84. If the high threshold 72 was not exceeded by the input signal, the output Q of the D-flip-flop 84 will be set high. The output Q of the D-flip-flop 84 is connected via a delay 86 to a reset input RESET of the D-flip-flop 84 to cause the flip-flop to be reset after a delay D2 to ensure a minimum pulse length for the output "clk" signal from the Q output of the D-flip-flop 84. An alternative to feeding back the output Q to the delay 86 is represented by the dotted line 85 from the delay circuit 82. Although a D-flip-flop 84 is shown in FIG. 5, another type of flip-flop could be used. The length of the single-triggered one-shot circuit 80 is adequate to coincide with the rising edge from the low output signal 78 from the second comparator 70 at all signal amplitudes.

The output "clk" from the output Q of the flip-flop 84 is provided as an input to an asynchronous n-bit counter 88. According to the type of counter used, counting can be disabled with an enable signal 56 before latching an n-bit output from the counter 88 to a loadable shift register 90. The counter 88 can then be reset and the counter 88 can be enabled to proceed with counting. Reading from the pixel circuit can then be effected during the next counting period in response to the clock signal 92. The overall operation of the triggered counter arrangement shown in FIG. 5 is to cause a count to be accumulated in the counter 88 on each occasion that a signal is received in response to a radiation hit having an energy between the high and low threshold values 72 and 74.

Figure 6:
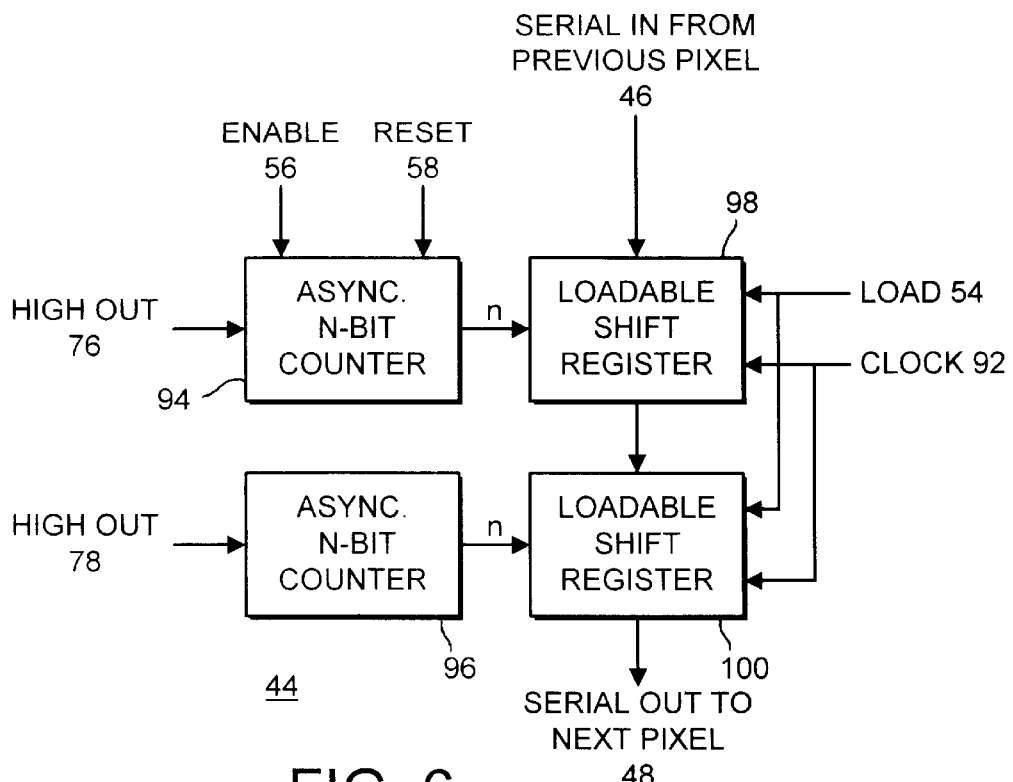
FIG. 6 is an alternative example of counter circuitry of an image cell circuit of FIG. 3.

An alternative arrangement for the counter circuitry is illustrated in FIG. 6. In the alternative counter circuitry shown in FIG. 6, both low and high output counts are directly obtained. This circuitry requires more circuit "real estate" and readout time than the circuitry of FIG. 5, but it does allow a direct readout of the number of counts between the thresholds by subtracting the low count from the high count and also allows the output of the number of the counts higher than the high threshold by counting the high count only. As shown in FIG. 6, an asynchronous n-bit counter 94 is connected directly to receive the high output of the first comparator 68. An asynchronous n-bit counter 96 is connected directly to receive the output 78 of the second comparator 70. In response to load signals 54, first and second loadable shift registers 98 and 100 can be loaded with the contents of the first and second asynchronous n-bit counters 94 and 96, respectively. As with the previous example, the contents of the loadable shift registers 98 and 100 can be read out in response to a clock signal 92 during a subsequent counting period.

Figure 7:
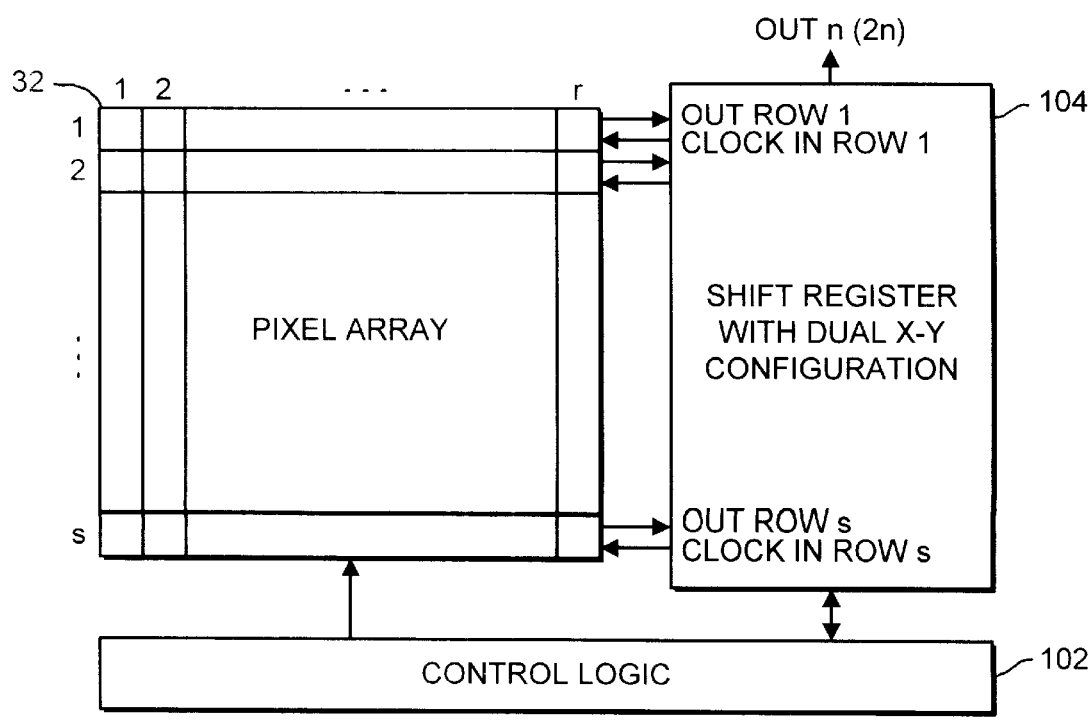
FIG. 7 is a digital readout configuration for an array of image cell circuits according to an embodiment of the present invention.

FIG. 7 is a schematic block diagram representing a two-dimensional array of image cells (an array of pixel cells) having r columns and s rows. The r*s pixel cells are connected to a control logic block which generates the load, reset, enable, hold and the threshold signals which are common to all pixels. Some of the signals may in fact be the same. The high and low threshold values may be adjustable to enable the desired energy range for accepted radiation hits to be varied. The control logic block can receive the Vdd and Vss supply voltages and to supply these voltages further to the pixel array 32 and the shift register 104. The loadable shift registers 90 or 98 and 100 of a row of individual pixel cells are chained together so that a serial input 46 of a loadable shift register 90 or 98 of one pixel circuit is connected to the serial output 48 of a loadable shift register 90 or 100 of a neighboring pixel circuit. In this way, the output from the individual pixel cells are chained together so as to form one long shift register (in this example, one shift register per row) which is connected to an n-bit (or 2*n-bits in a second set up) shift register 104. This register has a dual x-y storage capacity so that it can output rapidly s rows of n-bit (2*n) data. The clock for each pixel cell is distributed via the shift register 104 to ensure the same delay paths for each row of the pixel array on the semiconductor substrate.

Figure 8:
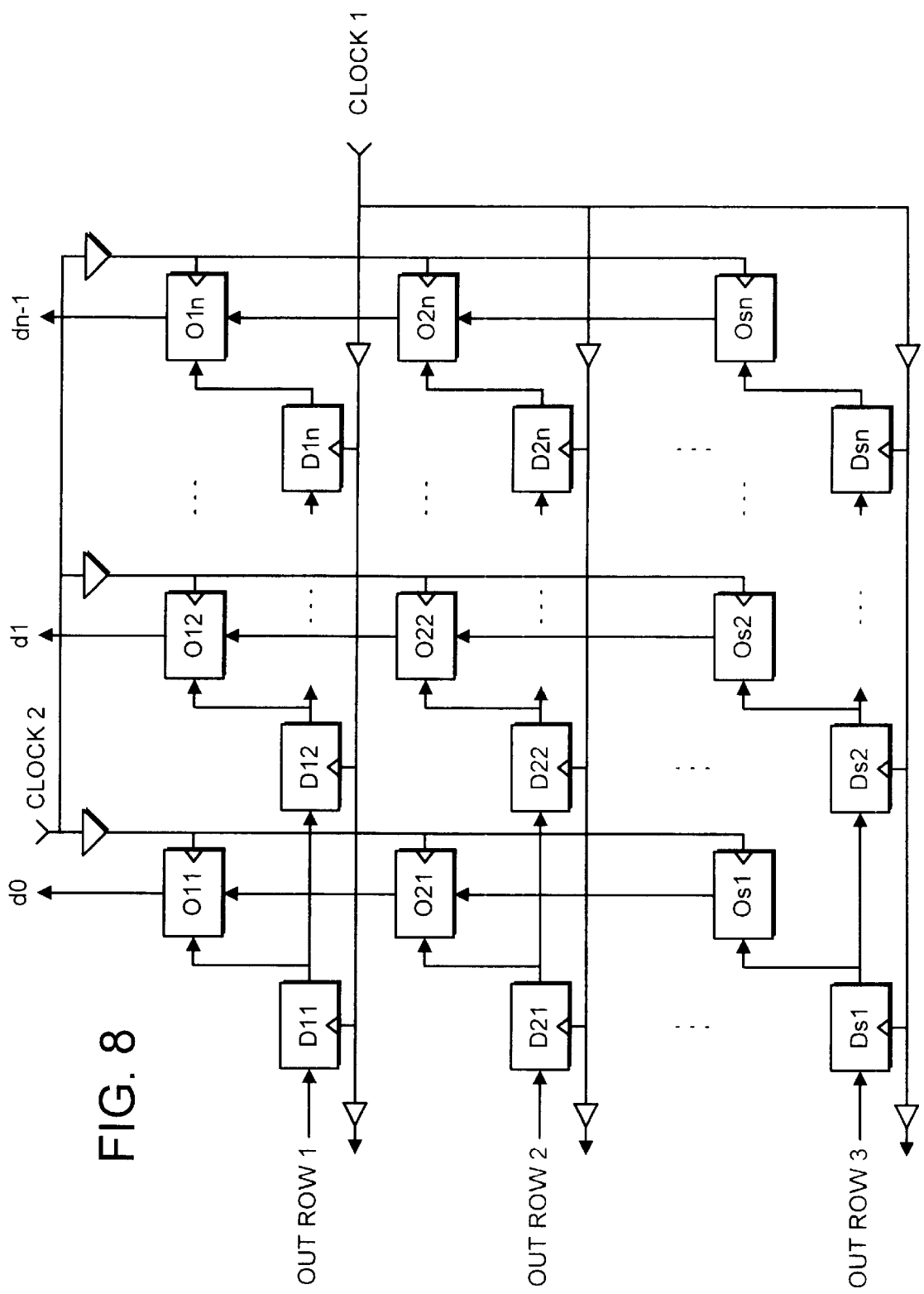
FIG. 8 is a schematic block diagram of a dual x-y shift register.

FIG. 8 illustrates the shift register 104 of FIG. 7 in more detail. This shift register has a dual x-y configuration formed from a horizontal shift register (stages Dxy) and a fast vertical loadable shift register (stages Oxy). Each bit from the respective rows of the pixel array are loaded simultaneously to the vertical register after all bits (n/2*n) have been clocked out for a single pixel cell. After that, the next pixel cell can be read out while the previous s rows of data have been read out vertically. It should be noted that the common load signal for the vertical shift registers marked Oxy has not been illustrated in FIG. 8.

Referring again to FIG. 1, it will be appreciated that the control electronics 24 comprises a combination of the control logic 102 and the shift register arrangement 104. The control electronics 24 is connected by a path represented schematically by the arrow 26 to an image processor 28. Thus, the data output from the shift register 104 can be supplied to the image processor 28. The image processor 28 includes data storage in which it accumulates digital values representative of the number of hits on the respective pixels of the pixel array and identifies the position of each pixel within the array. As a result, each image can be stored as a representation of a two-dimensional array of pixel values. The two-dimensional array can be stored by means of any appropriate database.

The image processor 28 accesses stored image data in the database to select a given image (all of the array) or part of the image (a sub-sample of the image array). The image processor reads the value stored for the selected pixel positions and causes a representation of the data to be displayed on a display 32 via a path represented schematically by the arrow 30. The data can of course be printed rather than, or in addition to, being displayed, and can be subjected to further processing operations. For example, background and noise can be subtracted as a constant from each pixel charge value. This pedestal and/or background subtraction is facilitated if an "empty image" is acquired prior to image taking. For each pixel a background value is deduced and can be subtracted accordingly. In order to control the operation of the image processor and the display, input devices 36 (for example a keyboard, pointing device, etc.) can be provided.

The foregoing describes embodiments of imaging devices and imaging systems which enable accurate counts of the number of radiation hits on a particular image cell of an image array. Embodiments of the present invention enable advantages of an accumulation-type imaging device such as that described in International patent application WO95/33332 to be achieved, with the added advantage that, rather than accumulating a charge value for incident pixels on the array during an accumulation period, the number of actual hits is recorded at each pixel cell of the pixel array. This provides highly-accurate imaging while still permitting fast readout with little or no "dead time" associated with readout.

Moreover, with the optional provision of thresholding circuitry on each pixel cell, the pixel circuit can be arranged to count only those radiation hits within desired incident energy parameters. As a result of this, the input device can be tuned to select only image radiation having desired energy values or ranges. An imaging device configured in accordance with such an embodiment of the present invention thus enables scattered radiation to be eliminated and only directly incident radiation to be counted. The use of the threshold circuitry on the individual pixel circuits of a device in accordance with such an embodiment enables the advantages of imaging devices such as those described in WO95/33332 to be achieved with further advantages of accurate counts of incident rays on each pixel and discrimination of incident ray energy at each pixel circuit.

The foregoing is a detailed description of particular embodiments of the present invention. The invention embraces all alternatives, modifications and variations that fall within the letter and spirit of the claims, as well as all equivalents of the claimed subject matter. Thus, although particular combinations of threshold and counter circuitry have been described with reference to the foregoing embodiments, other combinations and other embodiments are likewise possible within the sprit and scope of the invention. For example, in one embodiment described above the high and low threshold values are supplied from the control logic 102 and may be adjustable. However, in alternate embodiments the high and low threshold values could be derived from the Vdd and Vss supply voltages in a fixed manner. Further, if desired, an analog signal representative of the incident energy of a radiation hit can be taken at 106 (dotted line) from the differential amplifier 66 (see FIG. 4). This analog signal could then be accumulated in charge storage means (e.g., in a transistor or capacitor) to give a value representative of the total energy incident on a pixel detector from the last reset of the charge storage means.

What is claimed is:

1. A semiconductor imaging device including an imaging substrate comprising an image cell array of detector cells, each detector cell corresponding to an individual pixel of said image cell array, and which directly generate charge in response to incident high energy radiation, and a counting substrate containing an array of image cell circuits, each image cell circuit being associated with a respective detector cell, said image cell circuit comprising counting circuitry coupled to said respective detector cell, and configured to count plural radiation hits incident on said respective detector cell, wherein the counting substrate is directly connected to the imaging substrate by bump-bonds.

2. The imaging device of claim 1, wherein said image cell circuit comprises threshold circuitry coupled to receive signals generated in said respective detector cell and having values dependent on incident radiation energy, said counting circuitry being coupled to said threshold circuitry and being responsive to radiation hits within a predetermined energy range.

3. The imaging device of claim 2, wherein said threshold circuitry comprises first and second comparators configured to compare an input signal value to respective upper and lower threshold values.

4. The imaging device of claim 3, wherein said counting circuitry is configured to count radiation hits having an energy which generates an input signal value between said upper and lower threshold values.

5. The imaging device of claim 4, wherein said counting circuitry comprises trigger circuitry responsive to outputs of said first and second comparators, said trigger circuitry being configured to increment a counter in response to said input signal value.

6. The imaging device of claim 5, wherein said trigger circuitry comprises a flip-flop having a clock input coupled via a delay circuit to an output of said second comparator, a data signal input coupled via a one-shot circuit to an output of said first comparator, and an output coupled to said counter.

7. The imaging device of claim 6, wherein said image cell circuit further comprises a loadable shift register, said output of said counter being coupled to said loadable shift register, and said loadable shift register being chained with respective shift registers of other image cell circuits of said image cell circuit array.

8. The imaging device of claim 4, further comprising a first counter responsive to an output of said first comparator and a second counter responsive to an output of said second comparator.

9. The imaging device of claim 8, wherein an output of said first counter is coupled to a first loadable shift register, and said output of said second counter is coupled to a second loadable shift register, said first and second loadable shift registers being chained together and with respective loadable shift registers of other image cell circuits of said image cell circuit array.

10. The imaging device of claim 7, wherein said loadable shift registers are coupled to an output shift register arrangement external to said image cell circuit array.

11. The imaging device of claim 10, wherein said output shift register comprises a dual x-y configuration.

12. The imaging device of claim 1, wherein said image cell array is a pixel cell array.

13. A semiconductor radiation imaging system including a high energy radiation imaging device, said high energy radiation imaging device including an imaging substrate comprising an image cell array including an array of detector cells which directly generate charge in response to incident radiation and a counting substrate containing an array of image cell circuits, each image cell circuit being associated with a respective detector cell, said image cell circuit comprising counting circuitry coupled to said respective detector cell and configured to count plural radiation hits incident on said respective detector cell, wherein the counting substrate is directly connected to the imaging substrate by bump-bonds.

14. A method for high energy radiation imaging using a semiconductor radiation imaging device including an imaging substrate comprising an image cell array, the image cell array having an array of detector cells and a counting substrate containing an array of image cell circuits, wherein each detector cell is coupled to a corresponding image cell circuit, wherein the imaging substrate is directly connected to the counting substrate by bump-bonds, said method comprising the steps of:

directly generating charge in response to a radiation hit on a detector cell;

counting radiation hits incident on said detector cell in a corresponding image cell circuit.

15. The method of claim 14, wherein said counting step further comprises counting only radiation hits which generate charge within a predetermined energy range.

16. A semiconductor radiation imaging device including an imaging substrate comprising an image cell array of detector cells which directly generate charge in response to incident high energy radiation, and a counting substrate containing an array of image cell circuits, each image cell circuit being associated with and proximal to a respective detector cell, said image cell circuit comprising counting circuitry coupled to said respective detector cell and configured to count plural radiation hits incident on said respective detector cell, wherein the imaging substrate is directly connected to the counting substrate by bump-bonds.

17. The imaging device of claim 16, wherein said image cell circuit comprises threshold circuitry coupled to receive signals generated in said respective detector cell and having values dependent on incident radiation energy, said counting circuitry being coupled to said threshold circuitry and being responsive to radiation hits within a predetermined energy range.

18. A semiconductor radiation imaging system including a high energy radiation imaging device, said high energy radiation imaging device including an imaging substrate comprising an array of detector cells which directly generate charge in response to incident radiation and a counting substrate containing an array of image cell circuits, each image cell circuit being associated with a respective detector cell, said image cell circuit comprising counting circuitry proximally coupled to said respective detector cell and configured to count plural radiation hits incident on said respective detector cell, wherein the imaging substrate is directly connected to the counting substrate by bump-bonds.

19. A semiconductor imaging device including a semiconductor substrate comprising an image cell array of detector cells which directly generate charge in response to incident high energy radiation, the semiconductor substrate further including an array of image cell circuits, each image cell circuit being associated with a respective detector cell, said image cell circuit comprising counting circuitry coupled to said respective detector cell and configured to count plural radiation hits incident on said respective detector cell.

* * * * *